United States Patent
Lee et al.

(10) Patent No.: US 8,996,626 B2
(45) Date of Patent: Mar. 31, 2015

(54) TERMINAL AND INTERMEDIATE NODE IN CONTENT ORIENTED NETWORKING ENVIRONMENT AND COMMUNICATION METHOD OF TERMINAL AND INTERMEDIATE NODE

(75) Inventors: Ji Hoon Lee, Anyang-si (KR); Myeong Wuk Jang, Seoul (KR); Jae Hoon Kim, Yongin-si (KR); Do Jun Byun, Goyang-si (KR); Joong Hong Park, Seoul (KR); Sung Chan Choi, Uijeongbu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 267 days.

(21) Appl. No.: 13/160,647

(22) Filed: Jun. 15, 2011

(65) Prior Publication Data
US 2012/0136945 A1  May 31, 2012

(30) Foreign Application Priority Data
Nov. 30, 2010  (KR) .................. 10-2010-0120241

(51) Int. Cl.
  *G06F 15/16* (2006.01)
  *H04L 29/08* (2006.01)
(52) U.S. Cl.
  CPC ................................. *H04L 67/2838* (2013.01)
  USPC ............ 709/206; 709/219; 709/236; 709/248
(58) Field of Classification Search
  USPC ................................................ 709/206, 219
  See application file for complete search history.

(56) References Cited

U.S. PATENT DOCUMENTS

| | | | | |
|---|---|---|---|---|
| 6,463,454 B1 * | 10/2002 | Lumelsky et al. | ............ | 718/105 |
| 7,177,900 B2 * | 2/2007 | Ims et al. | ...................... | 709/201 |
| 7,272,603 B2 * | 9/2007 | Fujita et al. | ................... | 707/788 |
| 7,283,519 B2 * | 10/2007 | Girard | ........................... | 370/353 |
| 7,457,312 B2 * | 11/2008 | Weiss et al. | .................... | 370/468 |
| 7,568,002 B1 * | 7/2009 | Vacanti et al. | ................ | 709/203 |

(Continued)

FOREIGN PATENT DOCUMENTS

| | | |
|---|---|---|
| EP | 1 853 044 | 11/2007 |
| JP | 2003-032364 | 1/2003 |

(Continued)

OTHER PUBLICATIONS

International Search Report issued on Feb. 17, 2012, in counterpart International Patent Application No. PCT/KR2011/007742 (in English, 4 pages).

*Primary Examiner* — Melvin H Pollack
(74) *Attorney, Agent, or Firm* — NSIP Law

(57) ABSTRACT

A content sharing method of an intermediate node based on a content oriented network (CON) is provided. The method includes receiving, from a content requesting terminal, a proxy sharing request message with respect to a content including a content name of the content, the content including a plurality of data segments, generating data segment request messages with respect to each of the plurality of data segments corresponding to the content, in response to the reception of the proxy sharing request message, transmitting the data segment request messages to at least one terminal having the plurality of data segments, receiving the plurality of data segments from the at least one terminal, and transmitting the content to the content requesting terminal, using an aggregated data transmission scheme based on the received plurality of data segments.

27 Claims, 9 Drawing Sheets

(56) References Cited

U.S. PATENT DOCUMENTS

| | | | |
|---|---|---|---|
| 7,617,178 B2* | 11/2009 | Chavez et al. | 1/1 |
| 7,631,107 B2* | 12/2009 | Pandya | 709/250 |
| 7,801,945 B1* | 9/2010 | Geddes et al. | 709/203 |
| 7,840,679 B2* | 11/2010 | Zuckerman et al. | 709/226 |
| 7,840,680 B2* | 11/2010 | Zuckerman et al. | 709/226 |
| 7,937,476 B2* | 5/2011 | Farouki et al. | 709/227 |
| 8,009,682 B2* | 8/2011 | Gopinath et al. | 370/401 |
| 8,018,866 B1* | 9/2011 | Kasturi et al. | 370/252 |
| 8,046,830 B2* | 10/2011 | Rao et al. | 726/14 |
| 8,135,657 B2* | 3/2012 | Kapoor et al. | 706/45 |
| 8,151,323 B2* | 4/2012 | Harris et al. | 726/4 |
| 8,170,037 B2* | 5/2012 | Polcha et al. | 370/401 |
| 8,194,681 B2* | 6/2012 | Kaarela et al. | 370/401 |
| 8,225,411 B2* | 7/2012 | Yamauchi et al. | 726/26 |
| 8,228,791 B2* | 7/2012 | Bugenhagen et al. | 370/230 |
| 8,243,596 B2* | 8/2012 | Fedders et al. | 370/230 |
| 8,291,011 B2* | 10/2012 | Abu-Hakima et al. | 709/203 |
| 8,305,422 B2* | 11/2012 | Toya et al. | 348/14.08 |
| 8,307,389 B2* | 11/2012 | Sakai et al. | 725/25 |
| 8,370,528 B2* | 2/2013 | Bryers et al. | 709/249 |
| 8,401,535 B2* | 3/2013 | Toledano | 455/418 |
| 8,559,313 B1* | 10/2013 | Mukerji et al. | 370/235 |
| 2002/0059574 A1 | 5/2002 | Tudor et al. | |
| 2003/0033434 A1 | 2/2003 | Kavacheri et al. | |
| 2005/0203851 A1* | 9/2005 | King et al. | 705/51 |
| 2005/0232210 A1 | 10/2005 | Karaoguz et al. | |
| 2008/0010372 A1 | 1/2008 | Khedouri et al. | |
| 2008/0263090 A1 | 10/2008 | Roy-Chowdhury et al. | |
| 2009/0150518 A1* | 6/2009 | Lewin et al. | 709/219 |
| 2010/0100952 A1* | 4/2010 | Sample et al. | 726/9 |
| 2010/0146139 A1* | 6/2010 | Brockmann | 709/231 |
| 2010/0268836 A1* | 10/2010 | Jabri et al. | 709/231 |
| 2011/0078237 A1* | 3/2011 | Nakamura | 709/203 |
| 2011/0082946 A1* | 4/2011 | Gopalakrishnan | 709/231 |
| 2011/0145870 A1* | 6/2011 | Ramaswami et al. | 725/98 |
| 2011/0161409 A1* | 6/2011 | Nair et al. | 709/203 |
| 2012/0023535 A1* | 1/2012 | Brooks | 725/110 |
| 2012/0054322 A1* | 3/2012 | Steiner et al. | 709/223 |
| 2012/0079028 A1* | 3/2012 | Damola et al. | 709/204 |
| 2012/0102315 A1* | 4/2012 | Holtmanns et al. | 713/150 |
| 2012/0203872 A1* | 8/2012 | Luby et al. | 709/219 |
| 2012/0321052 A1* | 12/2012 | Morrill et al. | 379/32.01 |
| 2013/0232227 A1* | 9/2013 | Rajkumar et al. | 709/217 |

FOREIGN PATENT DOCUMENTS

| | | |
|---|---|---|
| KR | 10-2009-0017899 | 2/2008 |
| KR | 10-2008-0028636 | 4/2008 |
| KR | 10-2009-0017899 | 2/2009 |
| KR | 10-2010-0050594 | 5/2010 |
| KR | 10-2010-0050619 | 5/2010 |

* cited by examiner

TERMINAL AND INTERMEDIATE NODE IN CONTENT ORIENTED NETWORKING ENVIRONMENT AND COMMUNICATION METHOD OF TERMINAL AND INTERMEDIATE NODE

CROSS-REFERENCE TO RELATED APPLICATION(S)

This application claims the benefit under 35 U.S.C. §119 (a) of Korean Patent Application No. 10-2010-0120241, filed on Nov. 30, 2010, in the Korean Intellectual Property Office, the entire disclosure of which is incorporated herein by reference for all purposes.

BACKGROUND

1. Field

The following description relates to a terminal and an intermediate node in a content oriented networking (CON) environment, and a communication method of the terminal and the intermediate node.

2. Description of Related Art

A user may request a content another party has rather than a connection to the other party. However, to share a content using an end-to-end connection technology based on an Internet protocol (IP) of a current Internet structure, the user may be informed of an IP address of a counterpart device. Also, a connection link between the IP address of the counterpart device and an IP address of the user may be formed. To share the content, the user may utilize a third server for content sharing. Thus, the end-to-end connection technology based on the IP may have difficulty in supporting a content sharing service based on the content.

A content oriented networking (CON) is actively studied, and focuses on sharing a content requested by the user. As a representative technology, a content centric network (CCN) scheme may be provided.

SUMMARY

In one general aspect, a content sharing method of an intermediate node based on a content oriented network (CON) is provided. The method includes receiving, from a content requesting terminal, a proxy sharing request message with respect to a content including a content name of the content, the content including a plurality of data segments, generating data segment request messages with respect to each of the plurality of data segments corresponding to the content, in response to the reception of the proxy sharing request message, transmitting the data segment request messages to at least one terminal having the plurality of data segments, receiving the plurality of data segments from the at least one terminal, and transmitting the content to the content requesting terminal, using an aggregated data transmission scheme based on the received plurality of data segments.

The receiving of the proxy sharing request message may include receiving the proxy sharing request message with respect to the content using a session initiation protocol.

The proxy sharing request message with respect to the content may include identification information of the content requesting terminal based on a public key for a security between the content requesting terminal and the intermediate node.

Each of the data segment request messages may include the content name and identification information with respect to a corresponding data segment.

The transmitting of the data segment request messages may include determining a routing path from the intermediate node to the at least one terminal having the plurality of data segments, and transmitting the data segment request messages to the at least one terminal having the plurality of data segments, based on the routing path.

The method may include storing the received plurality of data segments so that the intermediate node is used as a cache with respect to a content request.

The transmitting of the content may include transmitting the content to the content requesting terminal using the aggregated data transmission scheme, where a reception of the plurality of data segments corresponding to the data segment request messages is completed.

The transmitting of the content may include requesting the content requesting terminal to receive the content, and transmitting the content to the content requesting terminal, based on a response to the request for a reception of the content.

The transmitting of the content may include transmitting the content to the content requesting terminal, where a request for a transmission of the content is received from the content requesting terminal.

The method may include transmitting, to the content requesting terminal, a message for requesting a preparation for a reception of the content, where the content has failed to be transmitted to the content requesting terminal, and retransmitting the content to the content requesting terminal.

The proxy sharing request message may include lifetime information indicating a period of time of validity for the proxy sharing request message.

In another general aspect, a content sharing method of a content requesting terminal based on a content oriented network (CON) is provided. The method includes transmitting, to an intermediate node, a proxy sharing request message with respect to a content including a content name of the content, so that the intermediate node generates data segment request messages with respect to each of a plurality of data segments corresponding to the content, and acquires the content using the data segment request messages, the content including the plurality of data segments, and receiving, from the intermediate node, the content based on the plurality of data segments using an aggregated data transmission scheme.

The transmitting may include transmitting the proxy sharing request message with respect to the content using a session initiation protocol, and the receiving includes receiving the content using a session initiation protocol.

The proxy sharing request message may include identification information of the content requesting terminal based on a public key for securing communications between the content requesting terminal and the intermediate node.

The proxy sharing request message may include lifetime information indicating a period of time of validity for the proxy sharing request message.

The receiving of the content may include receiving, from the intermediate node, a request for a reception of the content, responding, to the intermediate node, to the request for a reception of the content, and receiving the content transmitted by the intermediate node according to the response.

The receiving of the content may include requesting the intermediate node for a transmission of the content, and receiving the content transmitted by the intermediate node in response to the request for a transmission of the content.

In still another general aspect, an intermediate node performing a content sharing based on a content oriented network (CON) is provided. The intermediate node includes a receiving unit configured to receive, from a content requesting terminal, a proxy sharing request message with respect to a content including a content name of the content, the content including a plurality of data segments, a processing unit configured to generate data segment request messages with respect to each of the plurality of data segments corresponding to the content, in response to the reception of the proxy sharing request message, and a transmitting unit configured to transmit the data segment request messages to at least one terminal having the plurality of data segments. The receiving unit receives the plurality of data segments from the at least one terminal. The transmitting unit transmits the content to the content requesting terminal, using an aggregated data transmission scheme based on the received plurality of data segments.

The receiving unit may receive the proxy sharing request message with respect to the content using a session initiation protocol, and the transmitting unit may transmits the content using a session initiation protocol.

Each of the data segment request messages may include the content name and identification information with respect to a corresponding data segment.

The processing unit may determine a routing path from the intermediate node to the at least one terminal having the plurality of data segments, and the transmitting unit may transmit the data segment request messages to the at least one terminal having the plurality of data segments, based on the routing path.

The transmitting unit may transmit the content to the content requesting terminal using the aggregated data transmission scheme, where a reception of the plurality of data segments corresponding to the data segment request messages is completed.

The transmitting unit may request the content requesting terminal for a reception of the content, and transmits the content to the content requesting terminal, based on a response to the request for a reception of the content.

The proxy sharing request message may include lifetime information indicating a period of time of validity for the proxy sharing request message.

In still yet another general aspect, a content requesting terminal performing a content sharing based on a content oriented network (CON) is provided. The content requesting terminal including a proxy sharing request message generating unit configured to generate a proxy sharing request message with respect to a content, a transmitting unit configured to transmit, to an intermediate node, the proxy sharing request message with respect to the content, a receiving unit configured to receive, from the intermediate node, the content based on data segments, and a storage unit configured to store the received content from the intermediate node.

The intermediate node may aggregate the data segments being sent to the content requesting terminal.

The proxy sharing request message may include lifetime information indicating a period of time of validity for the proxy sharing request message.

Other features and aspects will be apparent from the following detailed description, the drawings, and the claims.

Figure 1:
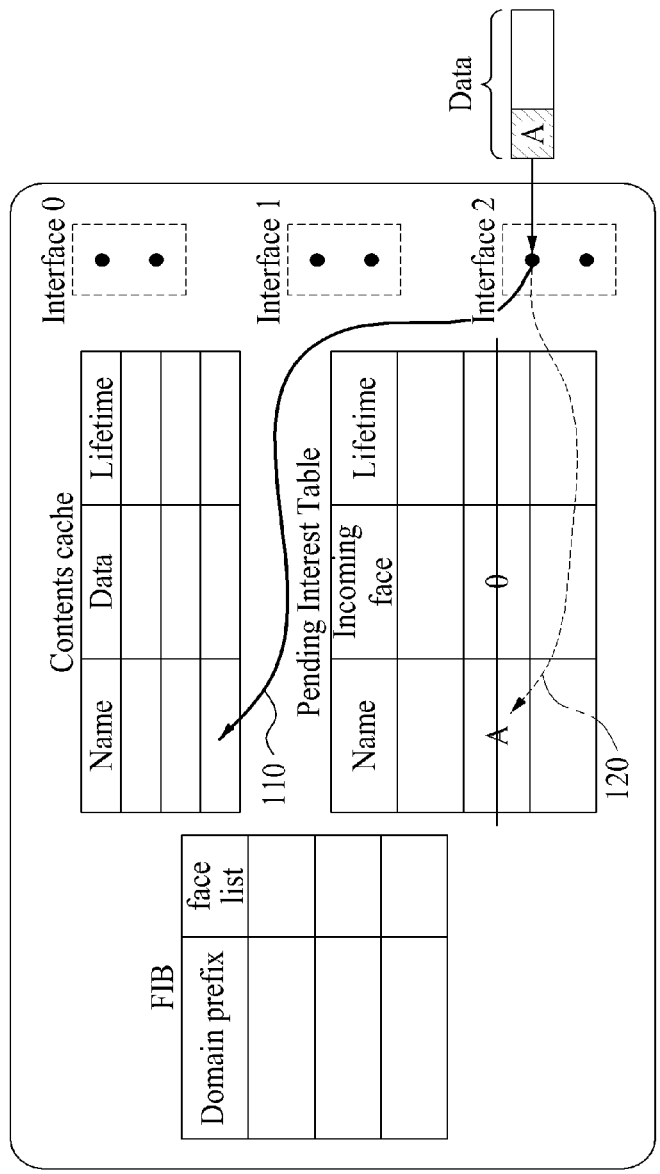
FIG. 1 is a diagram illustrating an example embodiment of an operation of an intermediate node in a general content centric network (CCN).

Throughout the drawings and the detailed description, unless otherwise described, the like drawing reference numerals will be understood to refer to the like elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

A content oriented networking (CON) scheme may utilize a transmission scheme in relation to an interest and data. The CON scheme may use a "content request content transmit" scheme, where a terminal, such as, for example, a mobile terminal, a user, or a user equipment transmits an interest and an intermediate node having the corresponding content. The intermediate node may transmit the corresponding content to the terminal. The interest may be a request with respect to a content based on a requested content name. Here, the intermediate node may correspond to another terminal, or may correspond to a hub, a router, or a device having a similar function.

The intermediate node may search a routing table to determine whether a routing list corresponding to a content name present in an interest exists in the routing table. The routing table may have a content name as an identifier. When the intermediate node has a corresponding content, the intermediate node may transmit a corresponding data packet using a path inverse to a path used by an interest packet. A content may be stored or may be transmitted at a data segment unit appropriate for a transmission unit. Each interest packet may include a number of particular data segments of the content. Each interest packet may correspond to a corresponding data segment of the content.

When a terminal requesting the content corresponds to a mobile terminal powered by a battery, a communication overhead may increase due to an interest packet generated in a segment unit, and a battery consumption may increase due to frequent packet exchange.

The terminal may transmit, to an intermediate node, an interest packet including a domain name and a content name. The intermediate node, having a corresponding content, may transmit a data packet. A message exchanged between a terminal and intermediate nodes may be classified into a control packet referred to as an interest and a data packet including a content.

FIG. 1 illustrates an example embodiment of an operation of an intermediate node in a general content centric network (CCN).

Referring to FIG. 1, the intermediate node of the general CCN may include a content cache, a forwarding information base (FIB), and a pending interest table (PIT). When the intermediate node receives each interest packet, the intermediate node may determine whether a corresponding content is included in a local cache, such as a content cache of the intermediate node. When the corresponding content is included in the local cache, the intermediate node may transmit the corresponding content utilizing an interface by which an interest packet is received. The interface may be connected to a terminal or another intermediate node.

When the corresponding content is not included in the local cache, the intermediate node may store, in the PIT, 1) information about an interface by which the interest packet is received and 2) information about the corresponding content. The intermediate node may use the FIB to determine an interface through which the interest packet is to be transmitted, and may transmit the interest packet to a subsequent intermediate node. Each intermediate node may repeat the operations of 1) determining an interface and 2) transmitting an interest packet until the interest packet arrives at an intermediate node having the corresponding content.

When Data A, such as Data segment A, enters an intermediate node through Interface 2, the intermediate node may verify whether Data A is included in the PIT. When Data A is included in the PIT, the intermediate node may store Data A in a content cache in operation 110, may transmit the data through which an interest in relation to data A has entered, and may delete Data A from the PIT in operation 120. The intermediate node may forward Data A using Interface 0. When Data A is not included in the PIT, the intermediate node may delete Data A entering through Interface 2.

When a CCN technology is applied to the Internet, based on an Internet protocol (IP), a corresponding network may have an overlay network form. Data may be sent by way of a tunnel between nodes having a CCN function.

When a terminal requesting a content corresponds to a mobile terminal, a transmission structure of the CCN based on an interest and data may lead to frequent processing operations based on a data segment unit configuring the content, and may cause a rapid energy depletion because the terminal may be in an "always-on" status. A functional node, 1) managing a status of nodes in a domain, a connection status of a network, and the like, and 2) enabling a smooth content exchange in a domain or between domains, may be used to facilitate a domain configuration.

Figure 2:
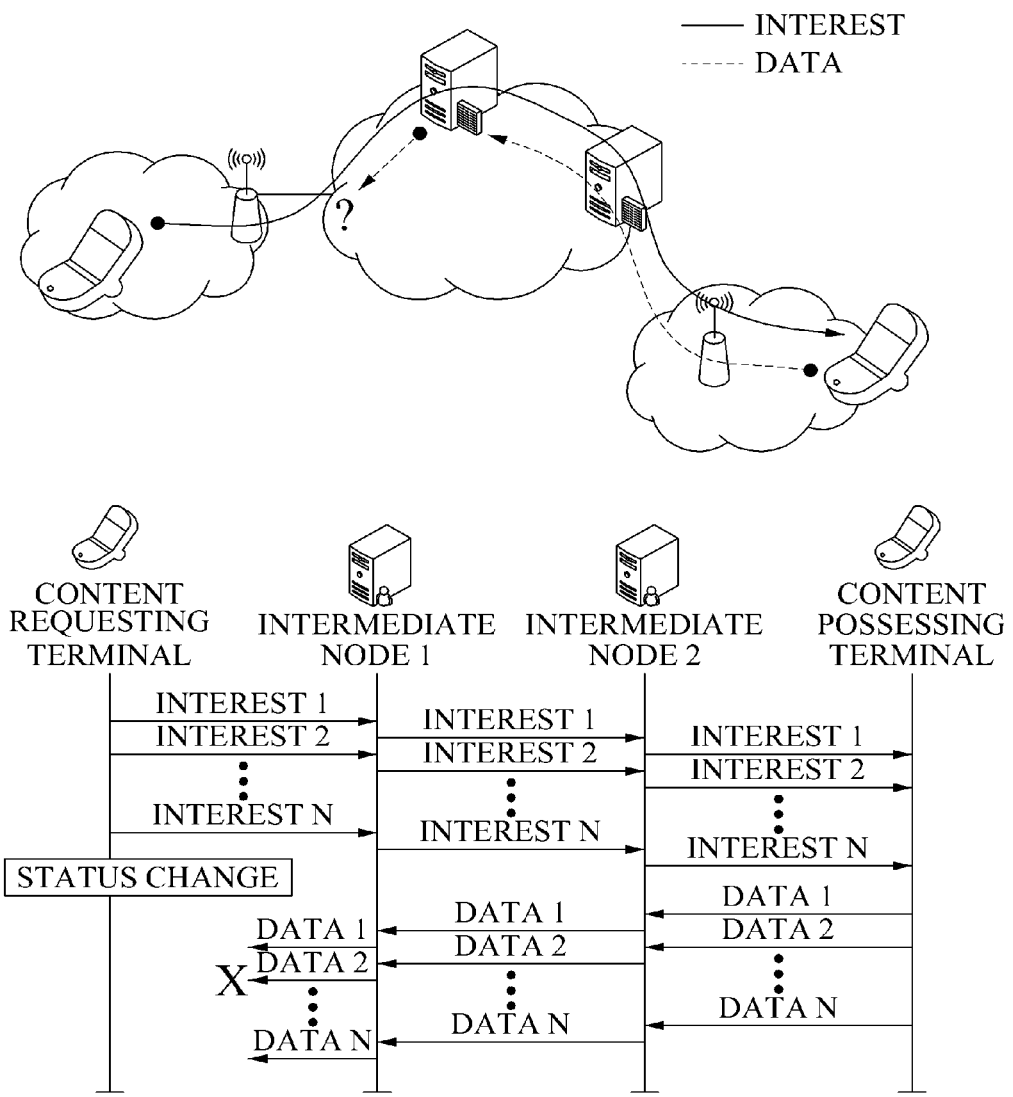
FIG. 2 is a flowchart illustrating an example embodiment of a scheme for transmitting an interest and data in a general CCN.

FIG. 2 illustrates an example embodiment of a scheme for transmitting an interest and data in a general CCN.

Referring to FIG. 2, a content requesting terminal may generate interest packets that for each data segment may configure a content for a content exchange, and may transmit interest packets to Intermediate node 1. The interest packets may be Interest 1 through Interest N. In this instance, the interest packets may be transmitted to Intermediate node 1 through a base station.

Intermediate node 1 may transfer the interest packets to Intermediate node 2, and Intermediate node 2 may transmit the interest packets to a content possessing terminal. The data packets may be each of data segments from Data 1 through Data N. Subsequently, the data packets may be transmitted from the content possessing terminal to the content requesting terminal through Intermediate node 2 and Intermediate node 1.

When a status of the content requesting terminal changes during an exchange of the content corresponding data packets may be unnecessarily and constantly transmitted to the content requesting terminal even though, the content requesting terminal may not receive the data packets in response to previously transmitted interests due to the change of the status. The content may be data segments. Thus, the change of status of the content requesting terminal may include, for example, a battery limit, a change to a mode where no operation is involved, a power off status, and the like. Thus, unnecessary data may be transmitted, and wireless resources may be wasted, at a high price.

To prevent waste of network resources, a status may not be changed until the content requesting terminal completes reception of the content. When a change of a status is not accepted, an operating time of a mobile terminal may be significantly reduced. The operating time may be operated by a battery.

Accordingly, to prepare for a change of a status of the content requesting terminal, and to reduce an increase in an amount of overhead caused by frequent data transmission, example embodiments may provide a scheme where the intermediate node shares a content in proxy according to a request from the content requesting terminal. As a scheme of requesting the intermediate node to share a content in proxy, a scheme of using a session initiation protocol (SIP), and a scheme of using an expanded interest packet may be given. The scheme may be a scheme of using a proxy sharing request message.

Figure 3:
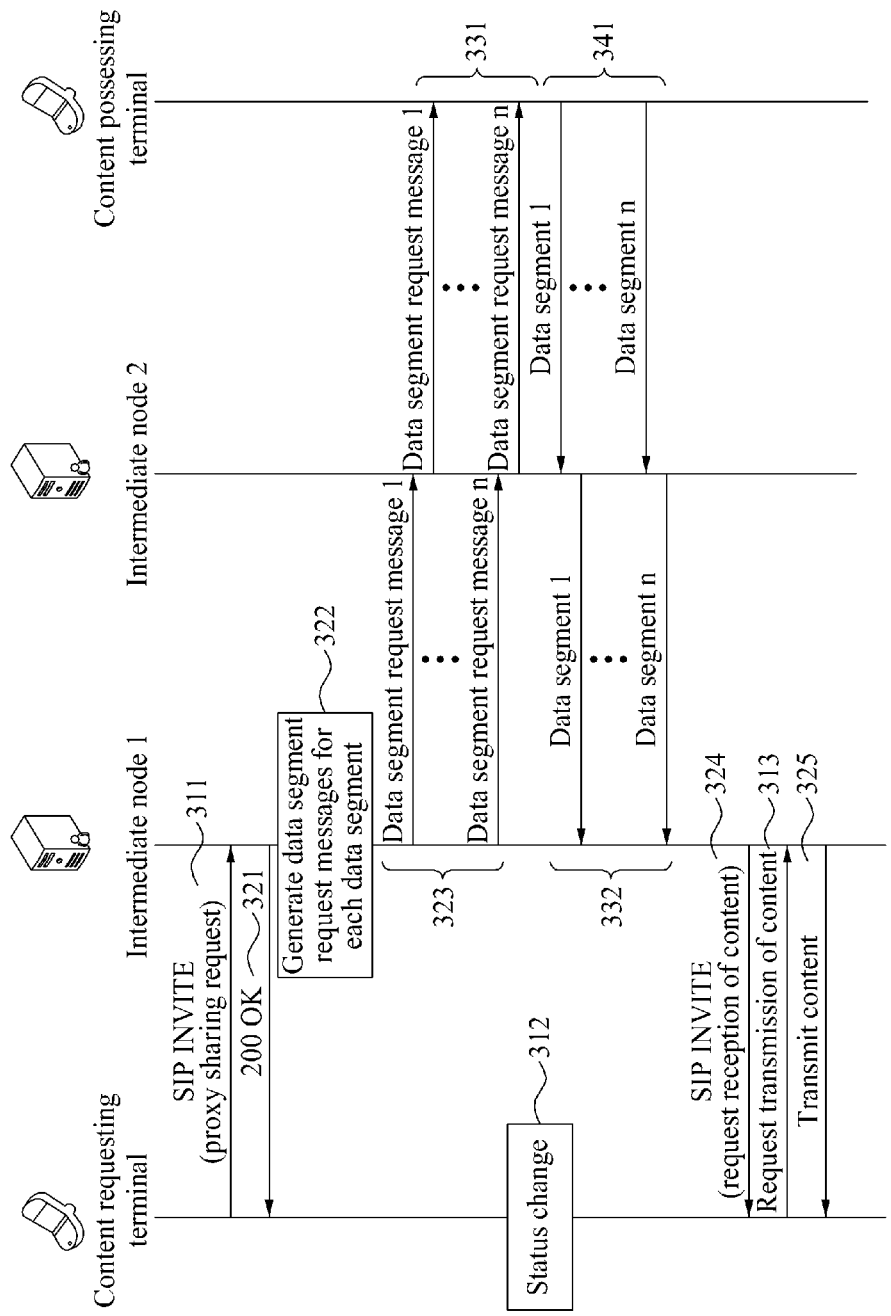
FIG. 3 is an operational flow illustrating an example embodiment of a scheme for sharing a content by proxy using a session initiation protocol.

FIG. 3 illustrates an example embodiment of a scheme for sharing a content by proxy using an SIP.

It may be assumed that both of a content requesting terminal and a first intermediate node include an SIP. A CCN transmission and an SIP INVITE message including a content disposition entity of the SIP may interwork. The intermediate node may recognize the SIP INVITE message as an application primitive. The intermediate mode may then operate a CCN daemon of the intermediate node.

The SIP INVITE message may have two types of content disposition, which include "instant" or "store & forward." The SIP INVITE message according to an example embodiment may include a store & forward type, and may include a content name. The content name may be a content to request the intermediate node for a proxy sharing. According to an example embodiment, a meaning of the store & forward type disposition may differ from an existing meaning, and will be described below. In operation 311, the content requesting terminal may transmit, to the first intermediate node, the SIP INVITE message requesting the proxy sharing.

In this instance, the content requesting terminal may include a hashing value capable of identifying a message transmitter in the SIP INVITE message. The first intermediate node may perform a process including a signature or encryption, and the like in relation to a terminal requested by the content requesting terminal and thus, a content security process of the content requesting terminal may be minimized.

Accordingly, stability may be secured, and processing overhead and latency may be reduced.

For example, the first intermediate node may check security before transmitting a content to the content requesting terminal. The first intermediate node may perform both requesting a content and relaying a content.

In operation 321, the first intermediate node may transmit, to the content requesting terminal, a response to the SIP INVITE message requesting a proxy sharing such as, for example, a 200 OK message.

In operation 322, a content may include a plurality of data segments, and the first intermediate node may generate data segment request messages corresponding to each of the plurality of data segments corresponding to a content requested to be shared by proxy. The data segment request messages include Data segment request message 1 through Data segment request message n.

In operation 323, the data segment request messages may be transmitted to a second intermediate node.

In operation 331, the second intermediate node may transfer the data segment request messages to a content possessing terminal having data segments.

In operation 341, in response to a reception of the data segment request messages, the content possessing terminal may transmit, to the second intermediate node, data segments. The data segments include Data segment 1 through Data segment n.

In operation 332, the second intermediate node may transfer the data segments to the first intermediate node. In this instance, the first intermediate node may not instantly forward the data segments to the content requesting terminal, and may store the data segments, so as to transmit an aggregated content where the data segments assemble, instead of separately transmitting the data segments, which will be further described below.

The first intermediate node receiving all data segments may transmit, to the content requesting terminal, the content where the data segments assemble.

After operation 311, a status of the content requesting terminal may change. For example, the content requesting terminal may change its status to an idle mode when no operations occur, and the like, in operation 312. In this example, even though the first intermediate node transmits the content, the content requesting terminal may not be able to receive the content.

Thus, in operation 324, the first intermediate node may transmit, to the content requesting terminal, an SIP INVITE message requesting the content requesting terminal to receive content. According to a response from the content requesting terminal, the first intermediate node may transmit the content, to the content requesting terminal, using an aggregated data transmission scheme.

When the aggregated data transmission scheme is used, the data segments may be assembled to a single content, and may be transmitted as the single content instead of being separately transmitted. Since each of an interest and data may be exchanged between the content requesting terminal and the first intermediate node once, a control overhead may be reduced in comparison with a case of separately transmitting the data segments.

When a predetermined period of time passes, after the content requesting terminal transmits the SIP INVITE message requesting a proxy sharing, the content requesting terminal may transmit a request to the first intermediate node for a transmission of the content in operation 313, and the first intermediate node may transmit the content to the content requesting terminal in response to the request from the content requesting terminal, in operation 325.

If the content fails to be transmitted, due a change of a status of the content requesting terminal, and the like, the first intermediate node may send a request to the content requesting terminal to change a status to be capable of receiving the content, and may retransmit the content.

A scheme described above may be applied to a case where the second intermediate node is excluded or to a case where another intermediate node is included between the second intermediate node and the content possessing terminal.

Figure 4:
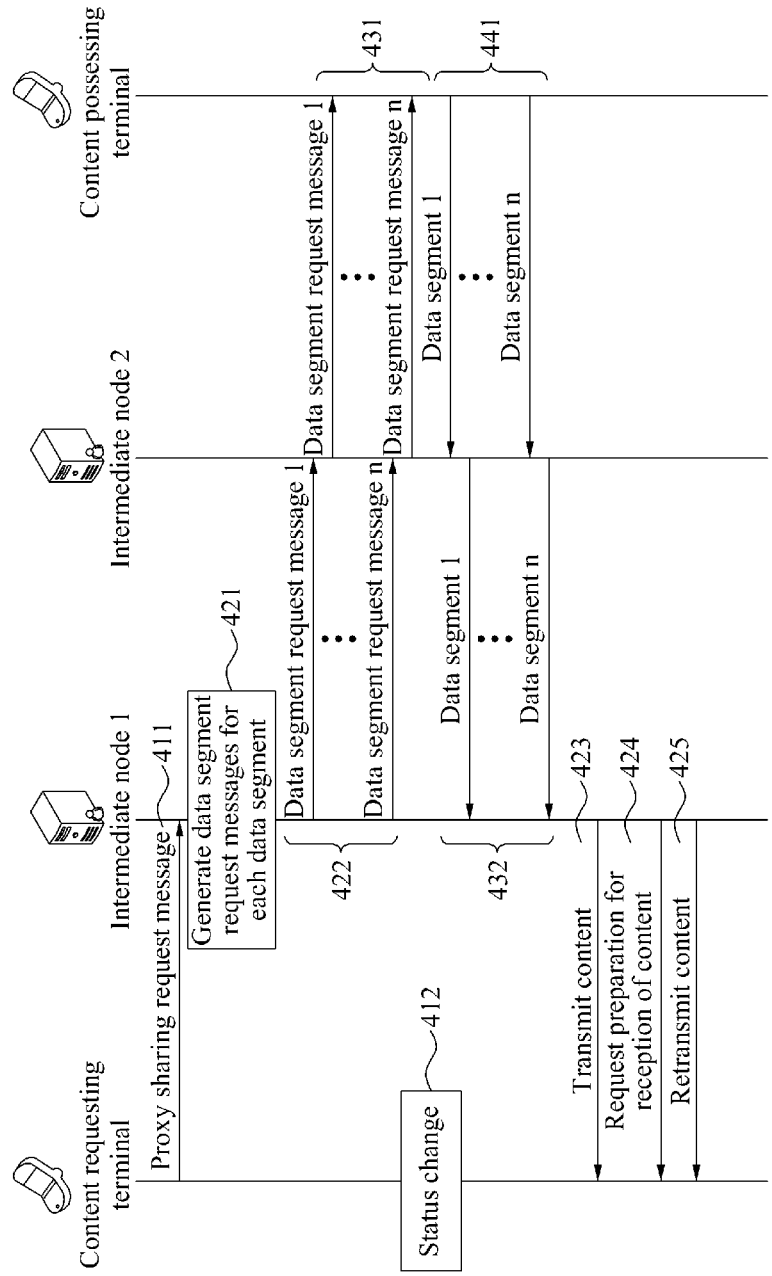
FIG. 4 is an operational flow illustrating an example embodiment of a scheme for to sharing a content by proxy using a proxy sharing request message.

FIG. 4 illustrates an example embodiment of a scheme for sharing a content using a proxy sharing request message.

Referring to FIG. 4, in operation 411, a content requesting terminal may transmit the proxy sharing request message to a first intermediate node. The proxy sharing request message may correspond with a type of expanded interest packet where interests for each of data segments included in a content are integrated.

The proxy sharing request message may include a name of a content requested by the content requesting terminal. The proxy sharing request message may include a lifetime in relation to a proxy sharing request. The lifetime with respect to a proxy sharing request may indicate a period of time of validity during which a content is to be shared by proxy in the first intermediate node. The lifetime with respect to a proxy sharing request may be used as a lifetime of a PIT entry in relation to a corresponding proxy sharing request message in the first intermediate node. Thus, when the lifetime expires, the first intermediate node may finish storing of a content received through a proxy sharing, even through the content requesting terminal may not receive the content.

Some processes, after the first intermediate node receives a proxy sharing request message, similar to the example embodiment illustrated in FIG. 3 may be omitted.

The first intermediate node may generate data segment request messages for each data segment in operation 421, and may transmit the data segment request messages to a second intermediate node in operation 422. The second intermediate node may transfer the data segment request messages to a content possessing terminal in operation 431, and the content possessing terminal may transmit data segments to the second intermediate node in operation 441. The second intermediate node may transmit the data segments to the first intermediate node in operation 432.

In this example embodiment, the first intermediate node receiving the data segments may not immediately forward the data segments to the content requesting terminal, and may store the data segments, so as to transmit an aggregated content including the data segments assembled, instead of separately transmitting the data segments. This transmission will be described in further detail below.

In operation 423, the first intermediate node receiving all data segments may transmit the content having aggregated data segments to the content requesting terminal.

After operation 411, a status of the content requesting terminal may change. For example, the status of the content requesting terminal may change to an idle mode when no operations occur, and the like, in operation 412. In this example embodiment, even though the first intermediate node transmits the content, the content requesting terminal may not receive the content.

Thus, when a content fails to be transmitted due to a change of a status of the content requesting terminal, the first intermediate node may transmit, to the content requesting terminal, a message requesting a preparation for a reception of a content, in operation 424. The preparation for a reception of a content may indicate changing a status of the content requesting terminal from an idle mode when no operations occur to an active mode, so that the content requesting terminal may receive the content. The message requesting a preparation for a reception of a content may correspond to a short message service (SMS) message. The first intermediate node request, using the SMS message, the content requesting terminal or a user of the content requesting terminal to change a status to an active mode. The content requesting terminal may transmit, to the first intermediate node, a response to the message requesting a preparation for a reception of a content transmitted by the first intermediate node.

In operation 425, the first intermediate node may retransmit the content to the content requesting terminal.

Similar to the example embodiment illustrated in FIG. 3, the first intermediate node may request the content requesting terminal for a reception of a content before transmitting the content, and the content requesting terminal may request the first intermediate node for a transmission of a content after a predetermined period of time elapses from a transmission of the proxy sharing request message.

Figure 5:
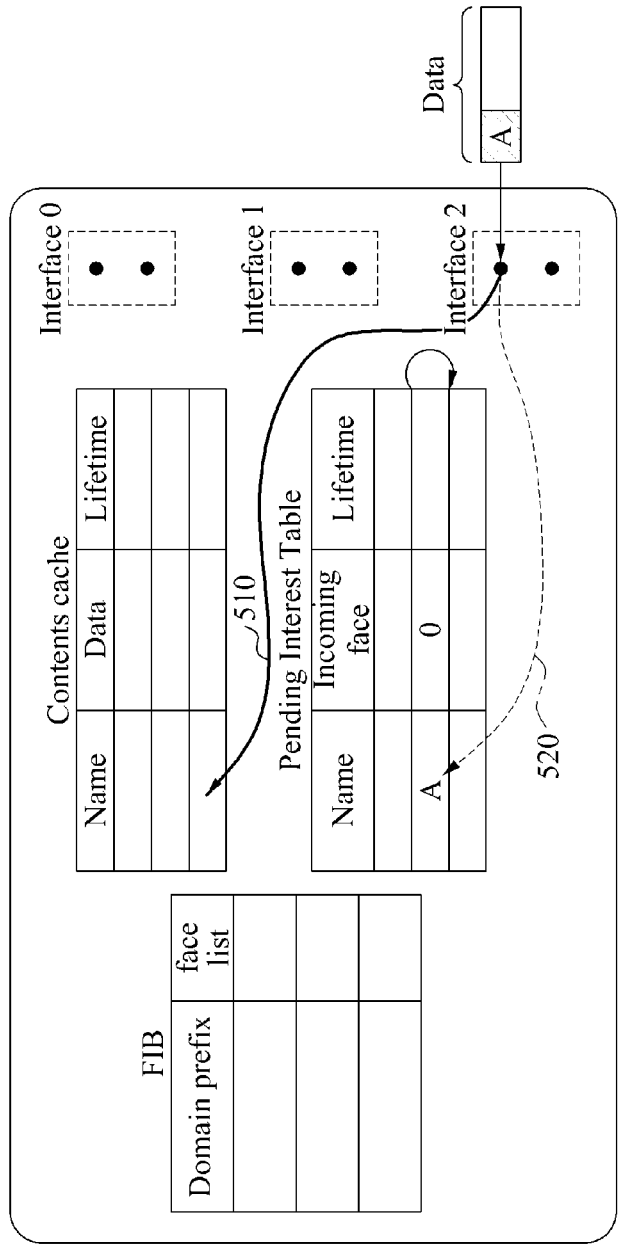
FIG. 5 is a diagram illustrating an example embodiment of an operation of an intermediate node in a CCN.

FIG. 5 includes an example embodiment illustrating an operation of an intermediate node in a CCN.

Referring to FIG. 5, operations of receiving data segments by the first intermediate node in FIG. 3 and FIG. 4, such as, for example, operation 332 and operation 432 will be further described. When Data A corresponding to Data segment A enters through Interface 2, the intermediate node according to an example embodiment may verify whether Data A is included in a PIT. The intermediate node may correspond with the first intermediate node.

When Data A is included in the PIT, the intermediate node may store Data A in a content cache in operation 510, and may delete Data A from the PIT in operation 520. In this example embodiment, as opposed to the example embodiment illustrated in FIG. 1, the intermediate node may not transmit such as, for example, forward Data A using Interface 0 through which a request for a content corresponding to Data A enters, and may wait, to transmit a content in a content unit instead of a segment unit, the intermediate node may not transmit Data A, and may wait until all data segments included in a content corresponding to Data A are received. When all data segments are received, the intermediate node may transmit, to the content requesting terminal, the content having aggregated data segments. When Data A is not included in the PIT, Data A entering through Interface 2 may be deleted.

Figure 6:
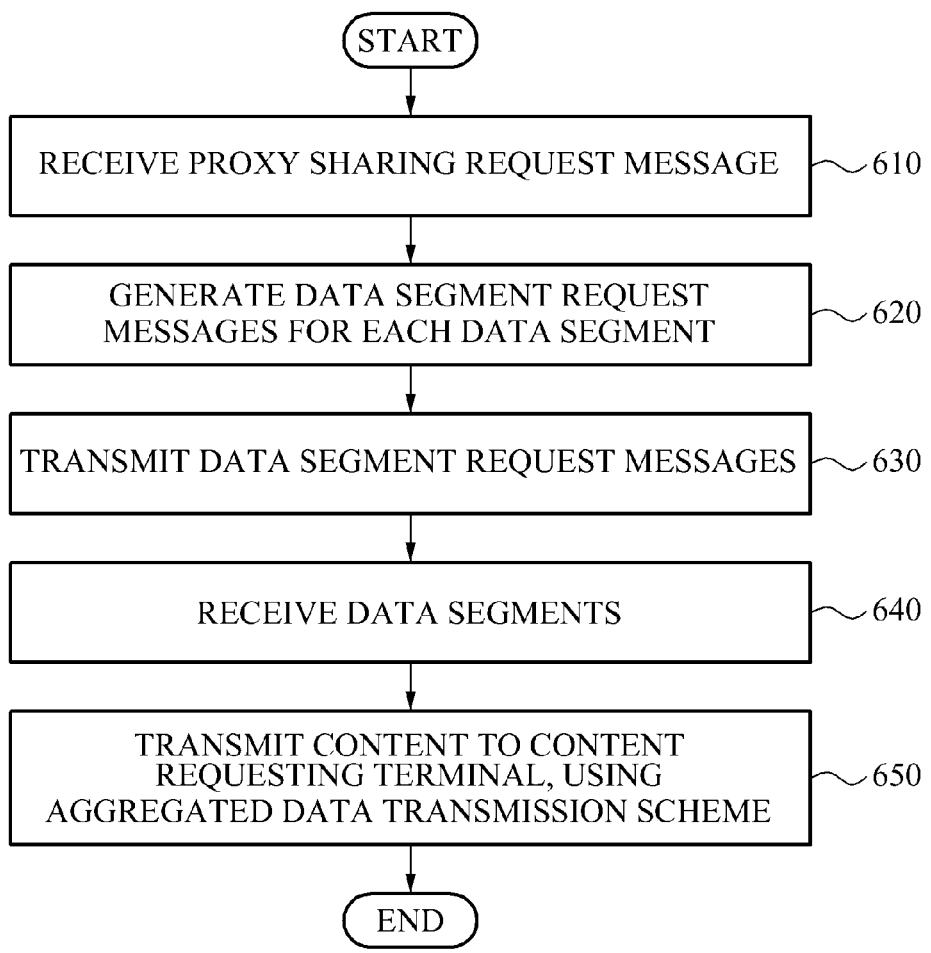
FIG. 6 is a flowchart illustrating an example embodiment of a content sharing method of an intermediate node based on a CCN.

FIG. 6 includes an example embodiment illustrating a content sharing method of an intermediate node based on a CCN.

Referring to FIG. 6, in operation 610, the intermediate node may receive, from a content requesting terminal, a proxy sharing request message in relation to a content including a content name of the content. The content may include a plurality of data segments. The intermediate node may receive the proxy sharing request message, using an SIP.

In this instance, the proxy sharing request message may include identification information of the content requesting terminal based on a public key for secure communications between the content requesting terminal and the intermediate node. The proxy sharing request message may verify an existence of the content requesting terminal by including the identification information of the content requesting terminal.

In operation 620, the intermediate node may generate data segment request messages corresponding to each of the plurality of data segments corresponding to the content, in response to the reception of the proxy sharing request message. Each of the data segment request messages may include the content name and identification information with respect to a corresponding data segment.

In operation 630, the intermediate node may transmit the data segment request messages to at least one terminal having the plurality of data segments. The intermediate node may determine a routing path from the intermediate node to the at least one terminal having the plurality of data segments, and may transmit the data segment request messages to the at least one terminal having the plurality of data segments, based on the routing path.

In operation 640, the intermediate node may receive the plurality of data segments from the at least one terminal. The intermediate node may store the plurality of data segments in a memory of the intermediate node so that the intermediate node may be used as a cache with respect to a content request.

When the reception of the plurality of data segments corresponding to the data segment request messages is completed, the intermediate node may transmit the content to the content requesting terminal, using an aggregated data transmission scheme based on the received plurality of data segments, in operation 650.

In this instance, the intermediate node may request the content requesting terminal for a reception of the content, and may transmit the content based on a response from the content requesting terminal.

The intermediate node may transmit the content to the content requesting terminal, where a request for a transmission of the content is received from the content requesting terminal.

When the content fails to be transmitted to the content requesting terminal, the intermediate node may transmit, to the content requesting terminal, a message for requesting a preparation for a reception of the content, may retransmit the content to the content requesting terminal.

Figure 7:
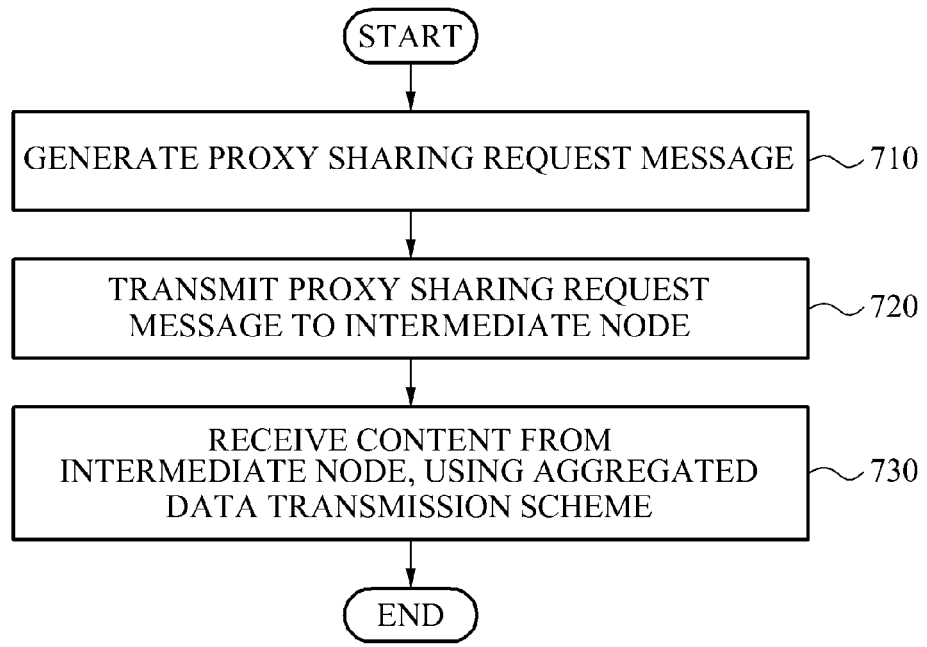
FIG. 7 is a flowchart illustrating an example embodiment of a content sharing method of a content requesting terminal based on a CCN.

FIG. 7 illustrates an example embodiment of a content sharing method of a content requesting terminal based on a CCN.

Referring to FIG. 7, in operation 710, the content requesting terminal may generate a proxy sharing request message with respect to a content. The proxy sharing request message may correspond to a message requesting the intermediate node to generate data segment request messages with respect to each of a plurality of data segments corresponding to the content, and to acquire the content using the data segment request messages. The proxy sharing request message may include identification information of the content requesting terminal based on a public key for a security between the content requesting terminal and the intermediate node, and lifetime information indicating a period of time of validity of the proxy sharing request message.

In operation 720, the content requesting terminal may transmit, to the intermediate node, the proxy sharing request message with respect to a content including a content name of the content.

In operation 730, the content requesting terminal may receive, from the intermediate node, the content based on the plurality of data segments using an aggregated data transmission scheme.

In this instance, the content requesting terminal may receive, from the intermediate node, a request for a reception of the content, and may respond, to the intermediate node, to the request for a reception of the content. The content requesting terminal may receive the content transmitted by the intermediate node based on the response.

The content requesting terminal may request the intermediate node for a transmission of the content, and may receive the content from the intermediate node.

A session initiation protocol may be used for a transmission of the proxy sharing request message with respect to the terminal, and a reception of the content.

Figure 8:
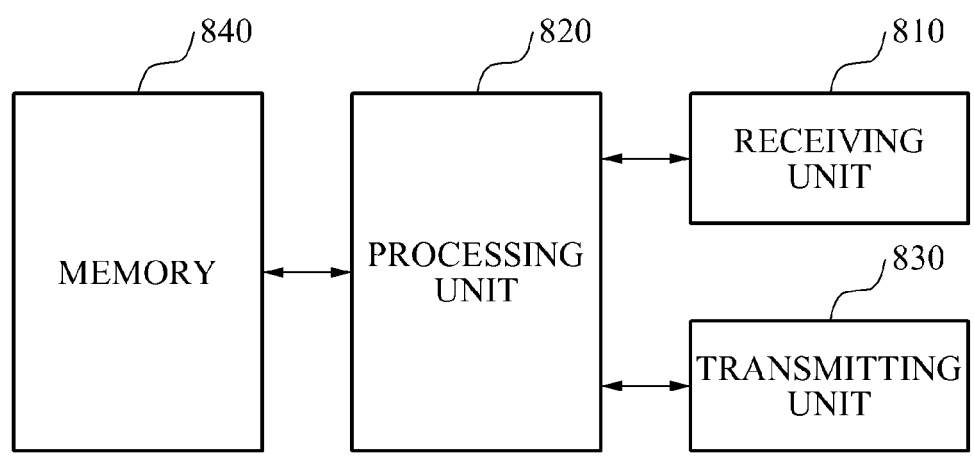
FIG. 8 is a block diagram illustrating an example embodiment of an intermediate node performing a content sharing based on a CCN.

FIG. 8 illustrates an example embodiment of an intermediate node performing a content sharing based on a CCN.

Referring to FIG. 8, the intermediate node according to an example embodiment may include a receiving unit 810, a processing unit 820, a transmitting unit 830, and a memory 840.

The receiving unit 810 may receive, from a content requesting terminal, a proxy sharing request message in relation to a content including a content name of the content.

The processing unit 820 may generate data segment request messages with respect to each of the plurality of data segments corresponding to the content, in response to the reception of the proxy sharing request message.

The transmitting unit 830 may transmit the data segment request messages to at least one terminal having the plurality of data segments.

The receiving unit 810 may receive the plurality of data segments from the at least one terminal, and the transmitting unit 830 may transmit the content, to the content requesting terminal, using an aggregated data transmission scheme based on the received plurality of data segments.

The memory 840 may store the received plurality of data segments.

Figure 9:
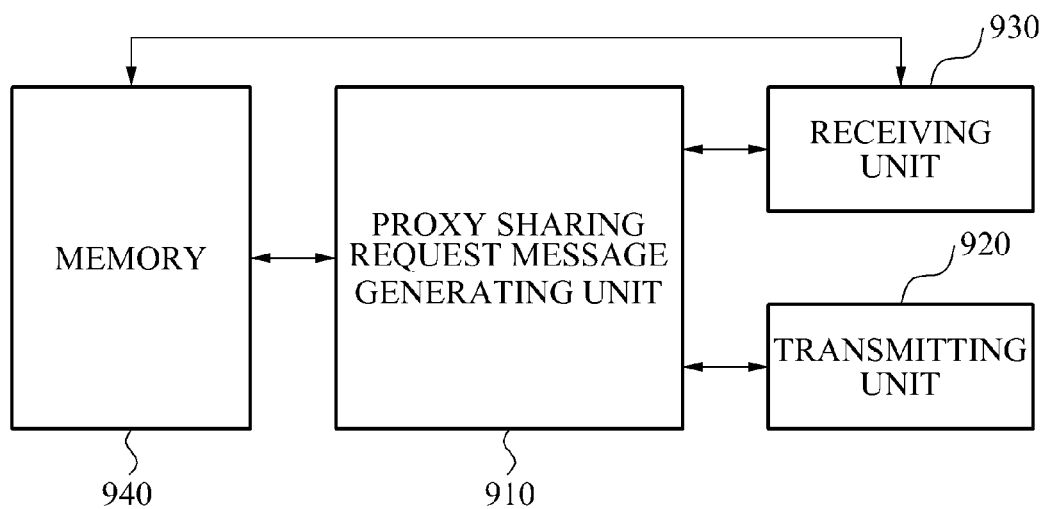
FIG. 9 is a block diagram illustrating an example embodiment of a content requesting terminal performing a content sharing based on a CCN.

FIG. 9 illustrates an example embodiment of a content requesting terminal performing a content sharing based on a CCN.

Referring to FIG. 9, the content requesting terminal according to an example embodiment may include a proxy sharing request message generating unit 910, a transmitting unit 920, a receiving unit 930, and a memory 940.

The proxy sharing request message generating unit 910 may generate a proxy sharing request message with respect to a content.

The transmitting unit 920 may transmit, to an intermediate node, the proxy sharing request message with respect to a content.

The receiving unit 930 may receive a content based on data segments, using an aggregated data transmission scheme.

The memory 940 may store the content received from the intermediate node.

The intermediate node and the content requesting terminal have been described. Descriptions of various embodiments with reference to FIG. 1 through FIG. 7 may be applied to the intermediate node and the content requesting terminal and thus, further descriptions may be omitted.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A content sharing method of an intermediate node in a content oriented network (CON), the method comprising:
   receiving, from a content requesting terminal, a proxy sharing request message with respect to a content including a content name of the content, and a plurality of data segments;
   generating data segment request messages with respect to each of the plurality of data segments corresponding to the content, in response to the reception of the proxy sharing request message;
   transmitting the data segment request messages to at least one terminal having the plurality of data segments;
   receiving the plurality of data segments from the at least one terminal;
   storing the received plurality of data segments so as to assemble the plurality of data segments into a single content;
   transmitting the content to the content requesting terminal; and
   transmitting, to the content requesting terminal, an instruction to change a status of the content requesting terminal to receive the content in response to the content failing to be transmitted to the content requesting terminal.

2. The method of claim 1, wherein the receiving of the proxy sharing request message comprises receiving the proxy sharing request message with respect to the content using a session initiation protocol.

3. The method of claim 1, wherein the proxy sharing request message with respect to the content includes identification information of the content requesting terminal based on a public key that provides security between the content requesting terminal and the intermediate node.

4. The method of claim 1, wherein each of the data segment request messages includes the content name and identification information with respect to a corresponding data segment.

5. The method of claim 1, wherein the transmitting of the data segment request messages comprises:
   determining a routing path from the intermediate node to the at least one terminal having the plurality of data segments; and transmitting the data segment request messages to the at least one terminal having the plurality of data segments, based on the routing path.

6. The method of claim 1, further comprising:
storing the received plurality of data segments so that the intermediate node is used as a cache with respect to a content request.

7. The method of claim 1, wherein the transmitting of the content comprises transmitting the content to the content requesting terminal using an aggregated data transmission scheme, where a reception of the plurality of data segments corresponding to the data segment request messages is completed.

8. The method of claim 1, wherein the transmitting of the content comprises transmitting the content to the content requesting terminal, in response to receiving a reply to the instruction.

9. The method of claim 1, wherein the transmitting of the content comprises transmitting the content to the content requesting terminal,
where a request for a transmission of the content is received from the content requesting terminal.

10. The method of claim 1, further comprising:
retransmitting the content to the content requesting terminal in response to receiving a reply to the instruction.

11. A content sharing method of a content requesting terminal in a content oriented network (CON), the method comprising:
transmitting, to an intermediate node, a proxy sharing request message with respect to a content including a content name of the content, so that the intermediate node generates data segment request messages with respect to each of a plurality of data segments corresponding to the content, and acquires the content using the data segment request messages, the content including the plurality of data segments which are assembled into a single content;
receiving, from the intermediate node, an instruction to change a status of the content requesting terminal to receive the content in response to the content failing to be transmitted to the content requesting terminal; and
receiving the content from the intermediate node.

12. The method of claim 11, wherein:
the transmitting comprises transmitting the proxy sharing request message with respect to the content using a session initiation protocol; and
the receiving comprises receiving the content using the session initiation protocol.

13. The method of claim 11, wherein the proxy sharing request message includes identification information of the content requesting terminal based on a public key that secures communications between the content requesting terminal and the intermediate node.

14. The method of claim 11, wherein the proxy sharing request message includes lifetime information indicating a period of time of validity for the proxy sharing request message.

15. The method of claim 11, wherein the receiving of the content comprises:
transmitting, to the intermediate node, a reply to the instruction; and
receiving the content transmitted by the intermediate node based on the reply.

16. The method of claim 11, wherein the receiving of the content comprises:
receiving the content transmitted by the intermediate node in response to transmitting a reply to the instruction.

17. An intermediate node performing a content sharing in a content oriented network (CON), the intermediate node comprising:
a receiving unit configured to receive, from a content requesting terminal, a proxy sharing request message with respect to a content including a content name of the content, and a plurality of data segments;
a processing unit configured to generate data segment request messages with respect to each of the plurality of data segments corresponding to the content, in response to the reception of the proxy sharing request message;
a storing unit configured to store the received plurality of data segments so as to assemble the plurality of data segments into a single content; and
a transmitting unit configured to
transmit the data segment request messages to at least one terminal having the plurality of data segments, wherein
the receiving unit is further configured to receive the plurality of data segments from the at least one terminal, and
the transmitting unit is further configured to
transmit the content to the content requesting terminal; and
transmit, to the content requesting terminal, an instruction to change a status of the content requesting terminal to receive the content in response to the content failing to be transmitted to the content requesting terminal.

18. The intermediate node of claim 17, wherein:
the receiving unit is configured to receive the proxy sharing request message with respect to the content using a session initiation protocol, and
the transmitting unit is configured to transmit the content using the session initiation protocol.

19. The intermediate node of claim 17, wherein each of the data segment request messages includes the content name and identification information with respect to a corresponding data segment.

20. The intermediate node of claim 17, wherein:
the processing unit is further configured to determine a routing path from the intermediate node to the at least one terminal having the plurality of data segments, and
the transmitting unit is configured to transmit the data segment request messages to the at least one terminal having the plurality of data segments, based on the routing path.

21. The intermediate node of claim 17, wherein the transmitting unit is configured to transmit the content to the content requesting terminal using an aggregated data transmission scheme, where a reception of the plurality of data segments corresponding to the data segment request messages is completed.

22. The intermediate node of claim 18, wherein the transmitting unit is configured to transmit the content to the content requesting terminal in response to receiving a reply to the instruction.

23. The method of claim 1, wherein the proxy sharing request message includes lifetime information indicating a period of time of validity for the proxy sharing request message.

24. The intermediate node of claim 17, wherein the proxy sharing request message includes lifetime information indicating a period of time of validity for the proxy sharing request message.

25. A content requesting terminal performing a content sharing in a content oriented network (CON), the content requesting terminal comprising:
- a proxy sharing request message generating unit configured to generate a proxy sharing request message with respect to a content;
- a transmitting unit configured to transmit, to an intermediate node, the proxy sharing request message with respect to the content;
- a receiving unit configured to
  - receive, from the intermediate node, an instruction to change a status of the content requesting terminal to receive the content in response to the content failing to be transmitted to the content requesting terminal, and
  - receive, from the intermediate node, the content based on data segments, which are stored so as to be assembled into a single content; and
- a storage unit configured to store the received content from the intermediate node.

26. The content requesting terminal of claim 25, wherein the intermediate node is configured to aggregate the data segments being sent to the content requesting terminal.

27. The content requesting terminal of claim 25, wherein the proxy sharing request message includes lifetime information indicating a period of time of validity for the proxy sharing request message.

* * * * *